United States Patent [19]

Fisher, Jr. et al.

[11] Patent Number: 5,675,800

[45] Date of Patent: Oct. 7, 1997

[54] METHOD AND APPARATUS FOR REMOTELY BOOTING A COMPUTER SYSTEM

[75] Inventors: Wendell Burns Fisher, Jr., Nashua, N.H.; Richard Sayde, Littleton, Mass.

[73] Assignee: Digital Equipment Corporation, Maynard, Mass.

[21] Appl. No.: 347,548

[22] Filed: Nov. 30, 1994

[51] Int. Cl.$^6$ .................................................. G06F 15/177
[52] U.S. Cl. ........................................................ 395/700
[58] Field of Search .................................................. 395/700

[56] References Cited

U.S. PATENT DOCUMENTS

| | | | |
|---|---|---|---|
| 5,142,680 | 8/1992 | Ohman et al. | 395/700 |
| 5,280,627 | 1/1994 | Flaherty et al. | 395/700 |
| 5,305,457 | 4/1994 | Takida et al. | 395/700 |
| 5,325,529 | 6/1994 | Brown et al. | 395/700 |
| 5,404,544 | 4/1995 | Crayford | 395/750 |
| 5,410,706 | 4/1995 | Ferrand et al. | 395/700 |
| 5,452,454 | 9/1995 | Basu | 395/700 |

*Primary Examiner*—Kevin A. Kriess
*Assistant Examiner*—John P. Chavis
*Attorney, Agent, or Firm*—David A. Dagg; Denis G. Maloney; Arthur W. Fisher

[57] ABSTRACT

A method and apparatus of remotely booting a target computer system from a host computer system over a communication medium comprises exchanging messages between the host and target computer systems. The host computer system controls the remote booting and communicates the initial booting request to the target computer system. The target computer system may respond by communicating to the host computer system whether it will boot. During booting, the target computer system transitions between a polling or stopped state and an interrupt-driven state by transitioning both a target operating system and network hardware in the target computer system between the polling and interrupt-driven states.

12 Claims, 8 Drawing Sheets

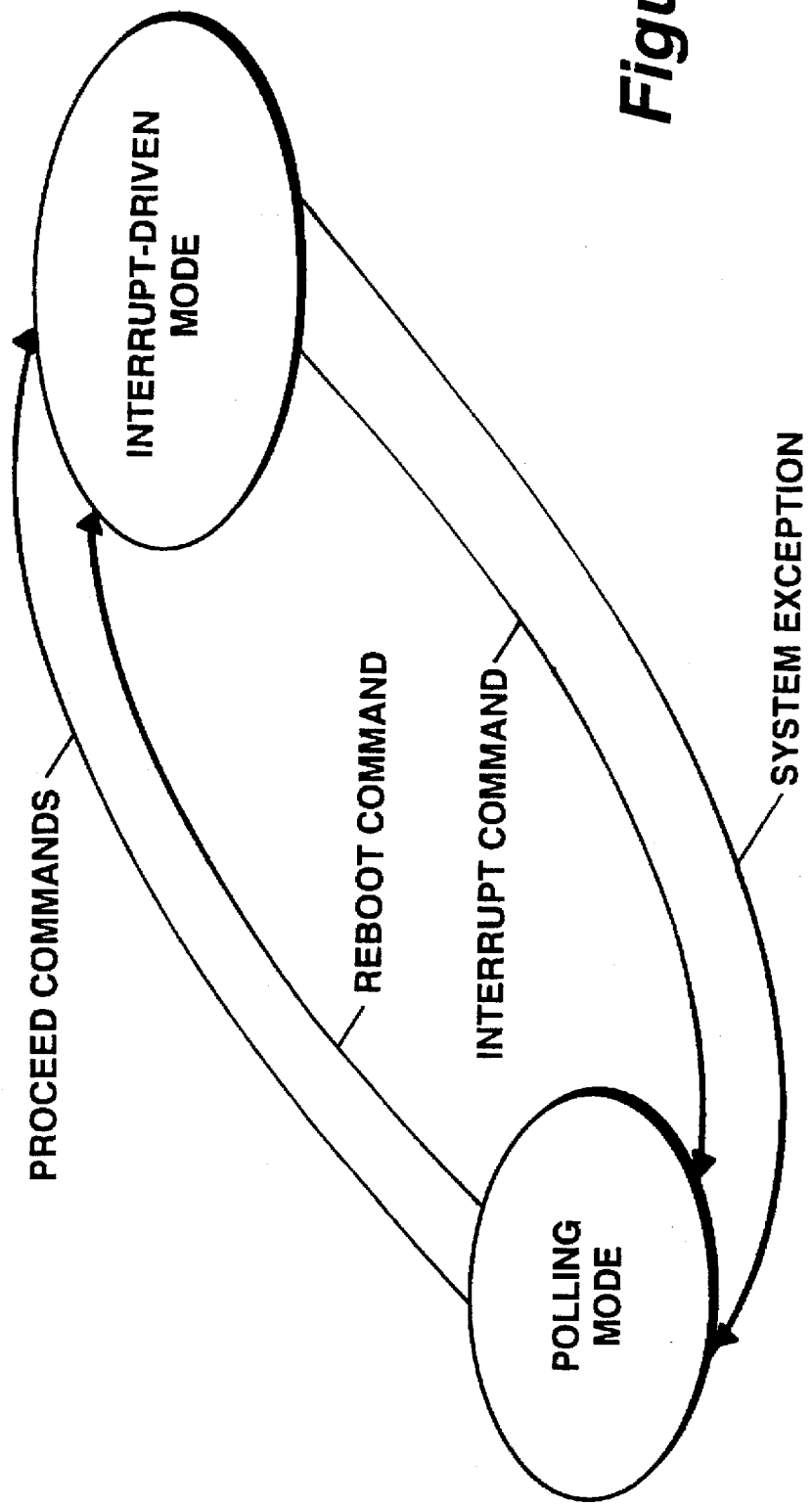

METHOD AND APPARATUS FOR REMOTELY BOOTING A COMPUTER SYSTEM

FIELD OF THE INVENTION

The present invention generally relates to methods and apparatus for booting a computer system and more specifically to remotely booting a first computer system from a second computer system when the two computer systems may not be in close physical proximity to each other.

BACKGROUND OF THE INVENTION

Booting a computer system that may comprise an operating system may be characterized as starting the computer system and initializing its operating system. An operating system may generally be described as software which provides an interface between hardware resources and a user to enable utilization of the hardware resources, for example. A typical way of booting a computer system is by entering special commands from a computer system console that is part of the computer system.

There are methods of booting the computer system while being external to the computer system, i.e., without using a computer process and hardware that is part of the computer system. Such methods may be characterized as remotely booting a computer system, such as from a first computer system booting a second computer system by issuing a remote boot command from the first computer system.

It is desirable to perform remote booting of the second computer system with a minimal amount of required user input and have an efficient exchange of messages to accomplish the remote booting, such as by limiting the number of messages exchanged.

For efficient communications between the two computer systems in remote booting, it is also desirable to use a communication medium which has a high communications bandwidth.

It is also desirable to have a flexible environment for remotely booting a computer system which does not require a new and special system configuration, such as a special point-to-point connection between a designated first computer system that is remotely booting a second computer system, and does not require close physical proximity, such as using a serial line connection may require. It is desirable for the environment to be able to use existing communication medium, such as an existing departmental Ethernet, in an existing network and computer system configuration.

There are a plurality of situations in which remote booting may be desirable, such as when remotely testing software on a second computer system and controlling the debugging session from a first computer system. The second computer system may "crash", i.e. have an unrecoverable error, and booting the second computer system may be the only way to resume testing. Specifically, remote testing of software in the second computer system may require frequent booting during testing. If the two computer systems are not be in close physical proximity, booting a physically remote or not easily accessible second computer system becomes impractical. For example, the second computer system may be physically located in a computer room which requires special security access, such as an activated key access card system. It is desirable to have a way to boot the second computer system from the first computer system which is independent of the physical proximity of the two computer systems and the means by which the two computer systems are connected.

It is desirable to provide a method and apparatus for booting a first computer system from a second computer system that overcomes the foregoing and other disadvantages of remotely booting a first computer system from a second computer system, and which further provide a more efficient and desirable means of remote booting. It is to these ends the present invention is directed.

SUMMARY OF THE INVENTION

The invention provides a new and improved method and apparatus for booting a first computer system from a second computer system such that the two computer systems. Further, the two computer systems do not have to be in close physical proximity. The invention affords a flexible solution that may be implemented using a plurality of commonly found and previously existing communications mediums to remotely boot the first computer system by specifying a series of messages exchanged between the two computer systems.

In accordance with the invention, a method of remotely booting a first computer system from a second computer system communicating messages over a communication medium, the method comprising sending a boot request message from the second computer system to the first computer system, acknowledging receipt of the boot request message by sending a first acknowledgement message to the second computer system, sending a response message from the first computer system to the second computer system indicating if the first computer system will boot, sending a second acknowledgement message from the second computer system to the first computer system upon receiving the response message wherein the second acknowledgement message indicates receipt of the response message if the response message indicates that the first computer system will not boot, and wherein the second acknowledgement message is a reconnect request message if the response message indicates that the first computer system will reboot, repeatedly sending the response message until the second acknowledgement message is received when the response message indicates that the first computer system will not boot, and booting the first computer system if the response message indicates that the first computer system will boot.

In another aspect, the invention also provides a method of remotely booting a target computer system from a host computer system. The target computer system comprises a portion of machine executable code being tested and the host and target computer system communicate over a communication medium. The host computer system includes a software debugger. The method comprising translating, using the software debugger, a debugger command into a boot request message, communicating the boot request message to the target computer system, acknowledging receipt of the boot request message by communicating a first acknowledgement message to the host computer system, sending a response message, from the target to the host computer system, that indicates if the target computer system will boot, sending a second acknowledgement message from the host computer system to the target computer system, repeatedly sending the response message until the second acknowledgement message is received when the response message indicates that the first computer system will not boot, and transitioning the target computer system to an interrupt-driven state and executing boot code when the response message indicates that the first computer system will boot.

Another aspect of the invention provides an apparatus for remotely booting a first computer system from a second computer system and the first and second computer systems communicate over a communication medium. The apparatus comprising first communication means for sending a boot request message from the second computer system to the first computer system, first acknowledging means for acknowledging receipt of the boot request message by communicating a first acknowledgement message to the second computer system, second communicating means for sending from the first computer system a response message that indicates whether the first computer system will boot, third communicating means for sending to the first computer system a second acknowledgement message wherein the second acknowledgement message indicates receipt of the response message if the response message indicates that the first computer system will not reboot, and wherein the second acknowledgement message is a reconnect request message if the response message indicates that the first computer system will boot, and first computer system boot means if the response message indicates that the first computer system will boot.

BRIEF DESCRIPTION OF THE DRAWINGS

FIG. 4 is a state transition diagram that represents the computer system states and transitions between the computer system states during remote debugging in a target computer system embodying the invention;

DETAILED DESCRIPTION OF PREFERRED EMBODIMENTS

The invention is particularly applicable to remote software debugging and will be described in that context. However, as will become apparent, the invention has greater utility and is applicable to a plurality of situations in which, generally, remotely booting a computer system is desirable.

Figure 1:
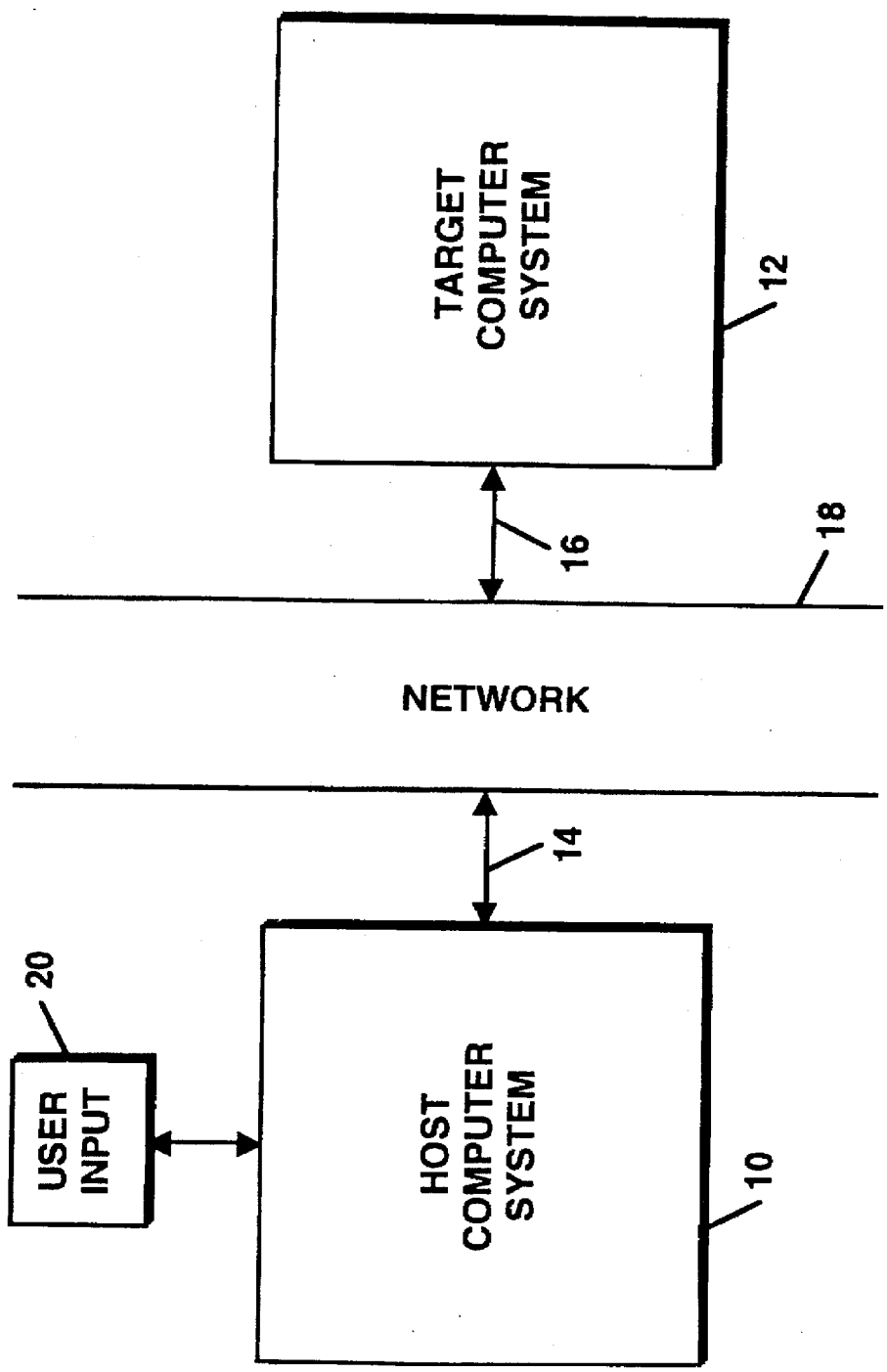
FIG. 1 is a simplified block diagram of a system configuration in accordance with the invention.

FIG. 1 illustrates a simplified network configuration that may embody the invention. A host or client computer system 10 communicates with a target or server computer system 12 over a network 18. The host computer system communicates with the network using communication line 14. Similarly, the target computer system communicates with the network using communication line 16. The host computer system may comprise an operating system and may control the remote debugging of software, such as operating system software, on the target computer system through user input 20.

As will be described in more detail, the configuration of FIG. 1 may be used to perform a remote boot of a target computer system by sending messages on the network between the host and target computer systems. Specifically, remotely booting a target computer system from a host computer system will be described in a remote debugging context in following text.

Figure 2:
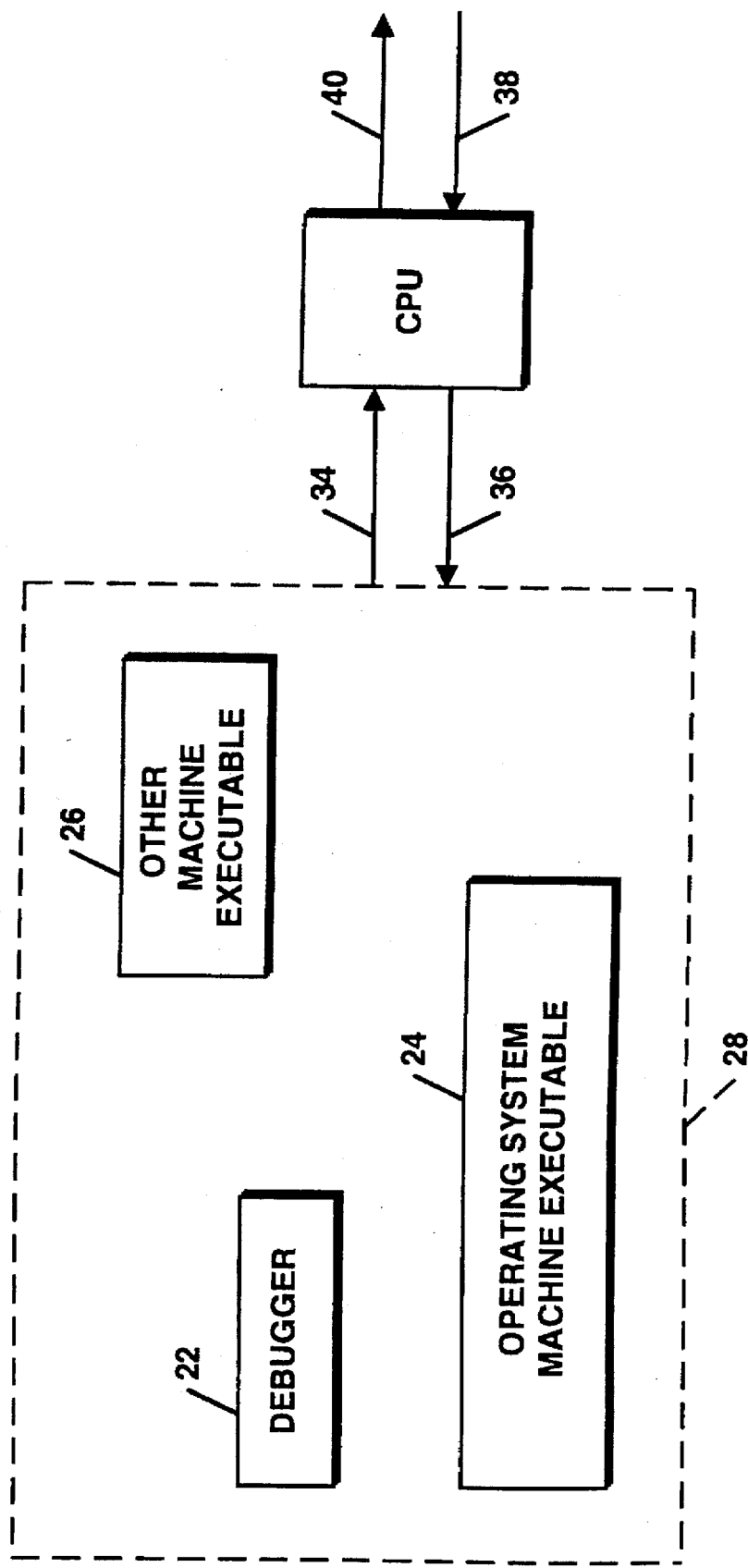
FIG. 2 is a simplified block diagram of a host or target computer system of FIG. 1.

FIG. 2 is a simplified illustration of a typical computer system which may be the host or target computer system of FIG. 1. The computer system may include memory 28, such as random access memory (RAM) or secondary storage, a central processing unit (CPU) 42, bus lines 34 and 36 which connect the memory and the CPU, and input and output lines 38 and 40, for example to a network interface. Additionally, a software debugger 22 and operating system machine executable code 24 may be stored in the memory.

The host computer system may include a software debugger that typically comprises machine-executable code executed by the CPU to test other machine executables 26. The other machine executables may be produced, for example, by compiling a software program to produce object code which is then linked, typically by a system linker, to produce machine executable code. Both the host and target computer systems may include operating system machine executable code which comprise machine instructions executed by the CPU to implement portions of an operating system. An example of operating system machine executable code is machine executable code for a device driver routine. The CPU reads in machine executable code from memory over bus lines 34 and executes the machine instructions. The operating system machine executable 24 or other machine executable 26 may be used for debugging purposes and comprise special debug information, such as debug symbol information. Such a machine executable to be used for debugging may be produced as by compiling and linking with special debugging options that are implementation dependent.

Figure 3:
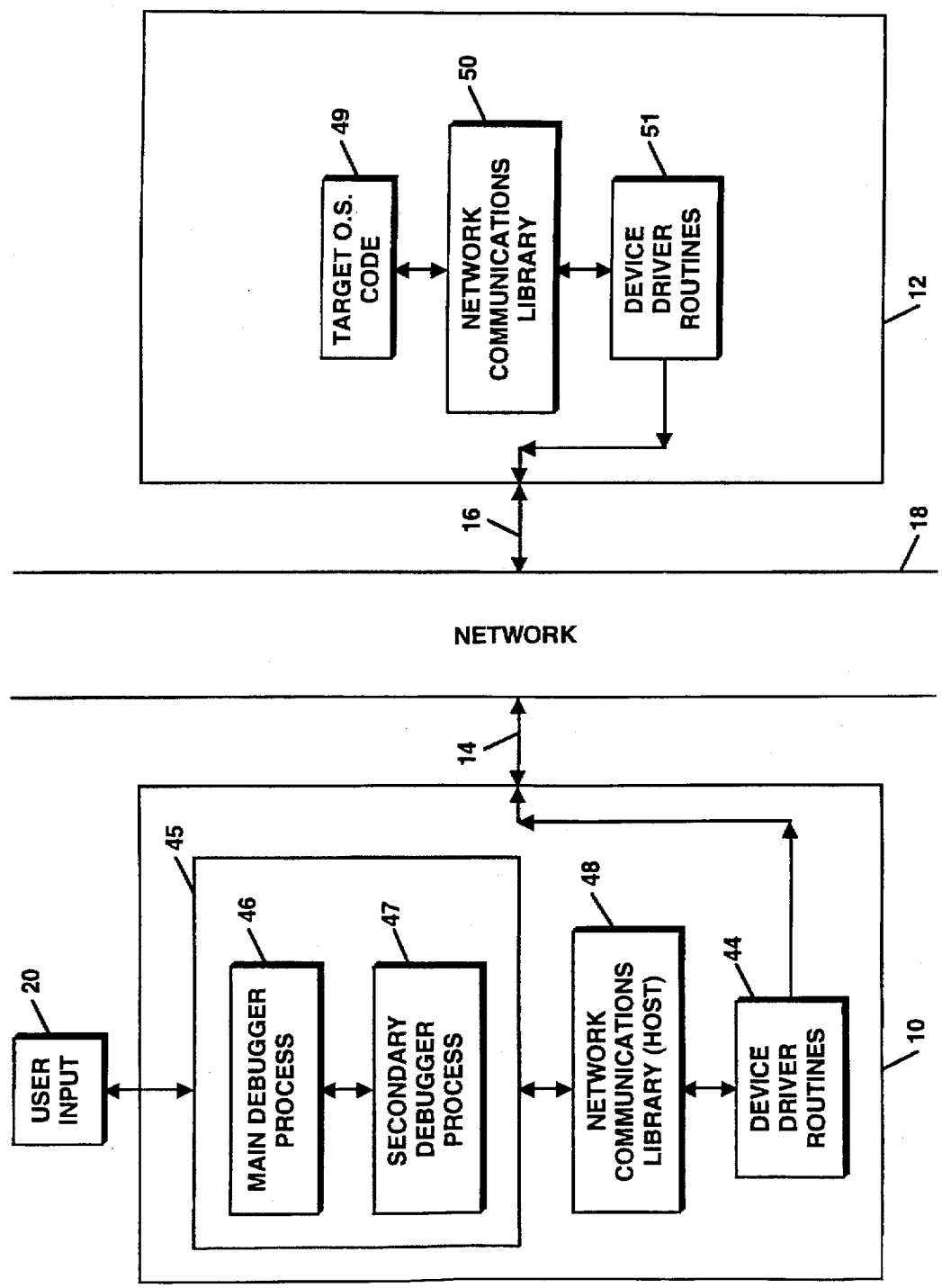
FIG. 3 is a block diagram illustrating the flow of control and communication between the various components of the debugging system of FIG. 1.

FIG. 3 illustrates the flow of control and communication between the various components of the remote debugging system configuration in accordance with the invention. A remote debugger 45 translates user input 20, such as a user debug command, into one or more messages. Each message contains a request that the target computer system perform a task in accordance with the translated user input. The remote debugger 45 may be a two process model that comprises a main debugger process 46 and secondary debugger process 47. The main debugger process functions as an interface between a user and the secondary debugger process 47. The main debugger process performs user interface tasks and translates user input into a series of one or more messages. The secondary debugger functions as an interface between the main debugger process and the network communications library 48. The series of messages are communicated by the secondary debugger process 47 to the network communications library 48 which packages messages. The messages are then communicated to device driver routines 44 which interface with a network hardware device to send a message to the target computer system 12 over the network 18 using a network connection 14. A message is forwarded over the network to the target computer system through a network connection 16. A device driver routine 51 retrieves an incoming message on a specific network hardware device. The message is forwarded to the network communications library 50 for unpackaging and then to the target operating system code 49.

The target computer system 12 performs the functions indicated by the series of messages and reports results or status information back to the host computer system in the form of one or more messages. Specifically, a portion of the target operating system code may comprise the software needed to perform remote debugging. Functionally, this portion of the target operating system 49 complements the remote debugger by implementing the functions indicated by a message sent from the host computer system.

A message that is sent from the target computer system to the host computer system follows a communications path in the reverse direction similar to the foregoing. The message may be sent by the target operating system code 49 to the network communications library 50 and then to a device driver routine 51 which interfaces with a network hardware device to send the message over the network 18 using the network connection 16. The host computer system receives the message from the network through a network connection 14. The message may be retrieved from a hardware device connected to the network by a device driver routine 44 which forwards the message to the network communications library 48. The message may then be sent to the secondary debugger process which notifies the main debugger process as needed depending on the specific message received. Messages may be sent from the target computer system to the host computer system, for example, to acknowledge receipt of a message or report information about the target computer system to the host computer system. The components of FIG. 3 will be described in more detail in following text.

REMOTE DEBUGGER

In more detail, the main debugger process 46 reads and translates a user debug command into one or more functional steps that correspond to a series of one or more specialized messages referred to as Network Debugging Protocol (NDP) messages to accomplish the user debug command. Generally, the NDP is a command/response protocol in which a command or request in the form of a message is issued by a sender to a receiver. The receiver may respond with a return message typically comprising the status of the executed command, or data. The messages comprising NDP may generally be classified as commands, reports and responses. Commands are those messages initiated by the host computer or client system of FIG. 1, for example. Reports are those messages initiated by the target or server computer system of FIG. 1, for example. Responses are those messages sent in response to a command or report message. The NDP and what may comprise an NDP message are described in more detail throughout the following text.

The main debugger process may perform a number of tasks. It may comprise machine executable code for the debugger user interface through which user debug commands are obtained and corresponding debug results displayed. The main debugger process may perform tasks such as syntactic verification of a user command, and determining the runtime address of symbol, such as a programming variable, or a line number.

The main debugger process calls the secondary debugger process 47 to issue an NDP message over the network. Functionally, the secondary debugger process is an interface between the main debugger process that communicates with the user, and the network. For example, the secondary debugger process may also notify the main debugger process when the target computer system reports the occurrence of an event, such as the execution of a breakpoint instruction in the target computer system.

NETWORK COMMUNICATIONS LIBRARIES AND DEVICE DRIVERS

The secondary debugger process may communicate a message to the network communications library 48, for example, by passing information comprising the message as one or more routine parameters. Functionally, the network communications library "packages" and "unpackages" the data being sent in a message format. Generally, a message has a predefined format in which the data representing an NDP command, for example, is placed. The network message format is known to the network communications library which "packages" the message data to be sent. Similarly, a message received by the host computer system, for example, is "unpackaged" by removing any messages headers and trailers. The message data may then be passed to the secondary debugger process. Both network communications libraries 48 and 50 which reside on the host and target computer system, respectively, provide similar functionality depending on whether the respective computer system is sending or receiving a message.

On the host computer system, a routine in the network communications library 48 interfaces with the network to send a message to the target computer system 12 by calling the appropriate device driver routine 44. Similarly, on the target computer system a routine in the network communications library 50 interfaces with the network to send a message by calling the appropriate device driver routine 51. Generally, a device driver or driver is primarily responsible for communicating system and user input and output requests, respectively, to and from a designated hardware device. Each type of hardware device typically has a separate driver that may include one or more device driver routines. A device driver routine may comprise machine executable code produced by translating source code into object code, as by compiling, and then linking the object code to produce machine executable code. Functionally, the device driver performs device-specific tasks, such as maintaining programming variables to reflect hardware status, and interfacing with the designated hardware device, such as an Ethernet device. Various device-specific tasks which a device driver in this embodiment may perform are described throughout the specification.

The target computer system 12 may receive a message on its network connection 16 by using a device driver routine 51. The receipt of a message is a system event that typically causes a device interrupt to be signalled and execution control is passed by the target operating system to a previously designated device driver routine, or device interrupt handler. The previously designated device driver routine 51 may then communicate the message to another previously designated routine in the network communications library 50. In turn, this routine in the network communications library 50 communicates the message to a portion of the target operating system code 49 that is used in remote debugging. Similarly, a message received by the host computer system 10 on its network connection 14 is communicated by a device driver routine 44 to the network communications library 48 and then to the remote debugger 45. Generally, an implementation and operating system dependent signalling mechanism may be used to communicate a received message from a device driver routine 51 to the network communications library 50, and then to the target operating system 49. Similarly, the signalling mechanism may be used to communicate a received message from a device driver routine 44 to the network communications library 48, and then to the remote debugger 45. Typical signalling mechanisms may require a programmer to specify a computer process or routine to which control is passed when a specific message type is received by a device driver routine.

In a preferred implementation for remote debugging, the target operating system may comprise a debugger target kernel that was previously described as complementing the remote debugger in the host computer system. The debugger target kernel may be an operating system process that executes in a privileged mode, such as an operating system kernel mode, and implements the functional steps indicated by a received message. Note that other implementations of a debugger target kernel may include machine instructions contained within a read-only memory (ROM) or programmable ROM (PROM).

NDP MESSAGES

Figure 3A:
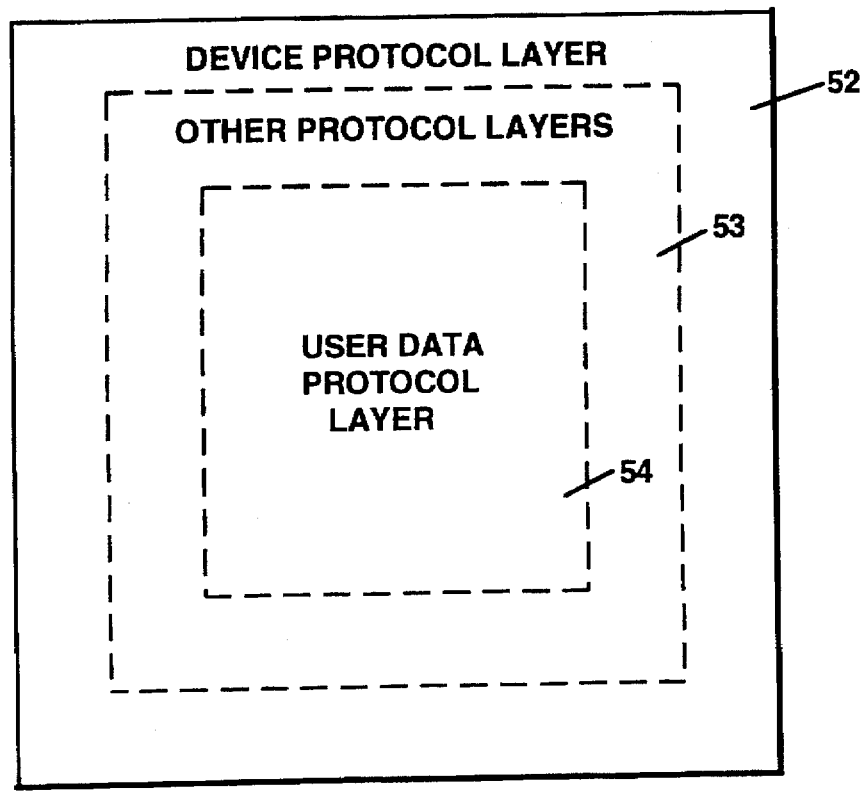
FIG. 3A depicts a conceptual message picture of the various message protocol layers that may comprise a message in accordance with the invention.
Figure 3B:
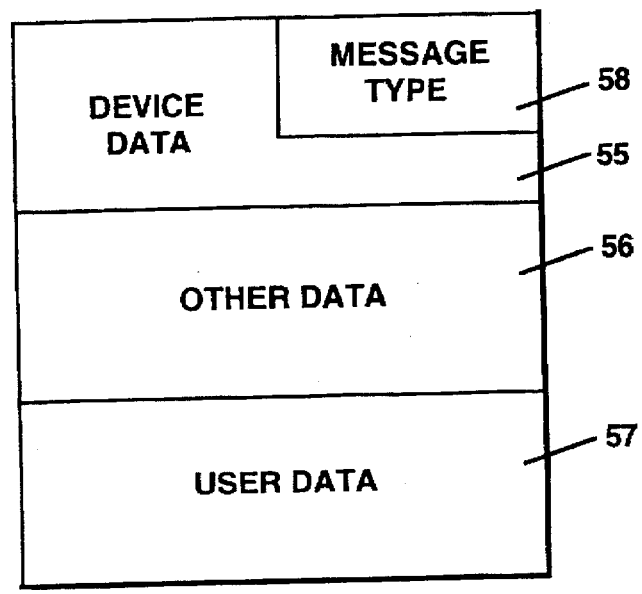
FIG. 3B illustrates a message that includes message data corresponding to the various protocol layers of FIG. 3A in accordance with the invention.

A message which is received, or sent, on a network by a device driver may comprise information for several different protocol layers such as a user data layer, that comprises the information of the NDP predefined message format, and a device protocol layer, such as an Ethernet protocol layer, that includes device specific information such as a physical device address. FIG. 3A illustrates a conceptual picture of the various protocol layers that may comprise a message in accordance with the invention. FIG. 3B depicts an actual message that includes a portions of message data, i.e., bytes of data, corresponding to each conceptual protocol layer of FIG. 3A. The device data 55 corresponds to the device protocol layer 53, the user data 57 corresponds to the user data protocol layer 54, and the other data 56 corresponds to the other protocol layers 53. Additionally, each portion of message data may be divided into a plurality of fields, such as the message type field 58 of the device data that comprises the device protocol layer.

Message data that corresponds to each protocol layer may be used and removed by a first portion of operating system software that implements a corresponding first protocol layer. The remaining message may then be passed to second portion of operating system software that implements a corresponding second protocol layer. For example, when a message is received, a device driver routine may remove a portion of the message pertaining to the device protocol layer, and pass on the remainder of the message, such as the information comprising the NDP predefined message format, to the network communications library. Similarly, a device driver may add the device specific information to user message data corresponding to the user data layer and form a final message that is sent over the network. The device protocol layer typically includes a message type field 58 that contains a message type value used by the device driver to identify callback routine or process in the network communications library which is to receive the message. The device driver may maintain a list comprising a message type value that indicates a message type such as NDP, and a callback routine corresponding to the receiver data value. Upon receiving a message that includes a particular message type value, the device driver then communicates the message to the corresponding callback routine in accordance with the list. Specifically, the device driver may extract the message type value from a received message, and search for a matching message type value in the list by comparing an extracted message to values in the list. Upon finding a matching message type value in the list, the device driver may communicate to the corresponding callback routine the remainder of the message that does not contain the device specific information.

The network communications library may then "unpackage" the message, as by extracting various data from the message, and communicate the extracted data, for example, to a designated processing routine. For example, in a host computer system comprising the OpenVMS for AXP operating system, the network communications library 48 may extract portions of the message and communicate these portions to the secondary debugger process.

COMMUNICATION MEDIUM

Using a communication medium other than a point-to-point connection, such as a network connection, for communicating between a first and a second computer system provides both a higher communications bandwidth and greater flexibility by allowing any two computer systems on the network to function as the host and target computer systems. Further a network connection typically does not require hardware solely dedicated for remote debugging between each predetermined host and target computer systems. Therefore, designating another computer system as a host or a target computer system does not require hardware modifications.

However, using a network connection, such as an Ethernet network connection, rather than a serial line point-to-point connection makes communications between a host and a target computer system more complex for various reasons. For example, with a network connection a message sent from a host computer system to a target computer system may be more complex because the message must identify a target computer system that may be one of a plurality of target computer systems. With a point-to-point connection, there is a single host computer system and a single target computer system, and, therefore, the message does not have to include information that identifies the target computer system. Additionally, using a network connection and a specific network device, such as an Ethernet, may create additional device dependencies and resource contentions. These problems may be avoided when using a point-to-point connection.

To establish communications between a host and target computer system, a preferred implementation embodying the invention may use an Ethernet network connection, comprising Ethernet device hardware, as opposed to a point-to-point connection, such as a serial line connection. There are advantages of using an Ethernet network connection rather than a point-to-point connection, such as a dedicated serial line connection. An Ethernet network connection, or Ethernet, is a fast communication medium with a high communication bandwidth. Additionally, no special dedicated connection is required to establish communications between the host and target computer systems. Typically, there is an existing general purpose network available which may be used to establish communications between the host and target computer systems.

Generally, any means of establishing network communications between the host and target computer systems may be used. However, a network connection, such as an Ethernet network connection, may have particular advantages, as previously stated.

In a preferred implementation embodying the invention that will be discussed in detail, both the host and target computer systems communicate messages using an Ethernet network connection and a private Ethernet 802.3 protocol in which the message type field value designates an NDP message. Specifically, in this implementation embodying the invention, the two computer systems communicate using an Ethernet network connection. A message sent between computer systems for debugging purposes comprises a message type value designating the private Ethernet NDP protocol. Upon receiving a message that comprises a message type value, a device driver may remove portions of the message which are device specific, i.e., comprise the Ethernet device protocol, and then communicate the remainder of the message and transfer control, as by calling a callback routine, to a processing routine in the network communications library previously designated as the NDP callback routine for received NDP messages. The NDP callback routine typically comprises code which "unpackages" the message, and dispatches the message to another previously designated processing routine, as a routine comprising the software debugger on the host computer system, or a routine included in the target operating system.

TARGET COMPUTER SYSTEM STATES

The target computer system may be in one of two modes: "polling mode" or "interrupt-driven mode". Note that in following text, polling mode may also synonymously be referred to as "stopped mode". When in polling mode, the target computer system is in a frozen or stopped state to enable, for example, examination of a programming variable that is used in operating system code being tested, and examination of register contents. Further, in polling mode, many of the target computer system's normal operations are suspended and the target computer system generally operates under the control of the remote debugger. Both hardware and software comprising the target computer system reflect this stopped state. When in interrupt-driven mode, the target computer system operates as it would under normal use conditions. More specifically, both system hardware and software are in a state such that typical system conditions exist and the target computer system does not appear to be frozen or stopped to a user. For example, the hardware devices and operating system are set such that a hardware device uses a typical communication signalling means to operate, i.e., device interrupts to signal completion of a task. Both of these modes will be described in greater detail in following text.

FIG. 4 is a state transition diagram that represents the two states or modes of the target computer system during remote debugging and the transitions which cause the target computer system to change modes.

Two particular system events may cause the target computer system to transition from polling mode to interrupt-driven mode. The first system event is when the target computer system receives a PROCEED NDP message from the host computer system. The PROCEED message indicates that the host computer system controlling the remote debugging session is instructing the target computer system to proceed with debugging by executing instructions located at the address contained in the program counter (PC) in the target computer system.

The second system event that may cause the target computer system to transition from the polling mode to the interrupt-driven mode is when the target computer system receives a REBOOT request NDP message from the host computer system. The target operating system reboots itself by, for example, entering the interrupt-driven mode and re-executing the operating system boot code. As will be described in more detail in following text, the target computer system may then transition to polling mode again when a BPT instruction is executed.

Once in the interrupt-driven mode, two particular kinds of system events cause the target computer system to transition into the polling mode. The first system event is when the target computer system receives an INTERRUPT NDP message from the host computer system instructing the target operating system to interrupt the currently executing process. For example, the target computer system may be in an infinite programming loop continuously executing a series of instructions. A user on the host computer system entering commands at a remote debugging session connected to the target computer system may observe the infinite loop execution. She interrupts the execution by inputting predetermined key strokes from a keyboard, such as simultaneously entering "CTRL" and "C", that indicate a user-generated debug interrupt command and cause the host computer system to send an NDP INTERRUPT message to the target computer system. This NDP INTERRUPT message may raise a target computer system interrupt causing the execution of a current process on the target computer system to be interrupted. Regarding this example, Those skilled in the art of programming will note that interrupts typically have a pre-determined system priority level that may not pre-empt or interrupt a currently executing system process that executes at a higher priority level. An operating system typically handles interrupts according to pre-determined system priority levels.

The second system event that causes transition from interrupt-driven mode to polling mode is when a target computer system exception occurs as initiated on the target computer system. There are two general classes of such exceptions—error conditions and non-error conditions. Error conditions indicate that an error has occurred while executing instructions on the target computer system, such as an invalid memory access due to an out-of-range memory address. When an error condition occurs, control returns to the target operating system as by a previously established exception handler, an NDP report message is sent to the host computer system reporting the error condition, and the target computer system remains in polling mode awaiting further messages from the host computer system.

Non-error conditions indicate that execution control on the target computer system is transferred to the target operating system in the polling mode, as by a previously established exception handler. The target computer system determines the context in which the non-error condition occurred, as by examination of register values and memory addresses, to determine subsequent action. For example, execution of a BPT instruction may indicate a non-error condition and may be executed in a plurality of contexts such as while executing instructions during booting of the target operating system, or executing a user-specified breakpoint previously set with a debug command.

GENERAL DESCRIPTION OF A PREFERRED IMPLEMENTATION

A preferred implementation embodying the invention will now be described in detail. Specifically, in this preferred implementation that will be discussed, both the host and target computer systems are running the OpenVMS for AXP operating system and communicate using an Ethernet network connection to send NDP messages. A portion of the OpenVMS for AXP operating system which resides in the target computer system may require testing and debugging. A stable, tested version of the OpenVMS for AXP operating system may reside in the host computer system. A network connection between the two computer systems may be established by booting the target computer system, and initializing, through sending a message using a remote debugger on the host computer system, the network connection request between the host and target computer systems. The target computer system may then respond to the initializing by sending a reply message with target system initialization information that is necessary for remote debugging. These steps of establishing a network connection are now described in more detail.

A target computer system may be booted and remain in polling mode or interrupt-driven mode after completion of the system booting. One typical way of booting a target computer system, such as one comprising an Alpha AXP processor and the OpenVMS for AXP operating system, is by entering a command, such as a BOOT command using a keyboard connected to a system console terminal. Functionally, "booting" a computer system causes boot code to be executed that initializes a computer system and is the process by which an operating system may assume control of the underlying computer system hardware. Additionally, operating system machine executable code may be loaded into memory and control then transferred to the operating system.

A user may boot the target computer system in one of the two alternate states by specifying various boot options, such as command line options and flags, that indicate polling mode or interrupt-driven mode. Using a mechanism, such as debug boot flags, may result in better utilization of target system resources by only performing certain tasks, such as loading debug-specific machine executable code into memory, as needed. For example, in an OpenVMS for AXP operating system, the BOOT command has command line options that, when specified, prepare a target computer system for remote debugging by, for example, loading required debugger machine executable code into memory. Additionally there are BOOT command line options that cause the operating system to remain in one of the two alternate runtime execution states or modes ready to receive debug commands from a host computer system.

A mode of the target computer system may comprise a particular software state of the operating system and a corresponding hardware state of a network device, such as an Ethernet network device. For example, in polling mode, the Ethernet device functions such that it does not signal an interrupt when a message is received on the target computer system. The Ethernet device must be polled or asked if it has received a message rather than the device signalling an interrupt. The target operating system is also in a corresponding state such that interrupts are masked out. To a user connected from a remote debugger, both the target operating system and the network device are stopped or frozen. In interrupt-driven mode, the Ethernet device signals an interrupt when it receives a message, i.e., interrupt-driven device. The target operating system is also in a corresponding state such that interrupts are not masked out. The target operating system does not appear frozen, i.e., user tasks and networking software may execute.

The target computer system may transition between the two modes by having the target operating system set its system interrupt level to correspond to the appropriate interrupt-driven or polling state, i.e., raised to mask out lower interrupts for polling mode, and lowered to allow normal interrupt-driven signalling mechanisms to function. Additionally, the target operating system may set a network hardware device state, such as the interrupt-driven state or polling mode, that corresponds to a target operating system state, by calling device driver routines 51, for example, which implement the hardware states by setting network hardware characteristics, such as an Ethernet adapter used in implementing the physical Ethernet network connection. A target computer system state comprises both a hardware state, such as an Ethernet hardware state, and a corresponding operating system state. Details as to when the transitioning between operating system and hardware device states my be performed are discussed in paragraphs which follow. The device driver routines 51 may be called directly from the operating system code 49, or the routines may be called indirectly through a routine in the network communications which in turn calls the correct device driver routine.

In this implementation, the target computer system uses two separate device drivers to set the appropriate Ethernet hardware state and facilitate communications in remote debugging. An OpenVMS boot device driver is used for communications when the target operating system is in polling mode. A normal interrupt-driven device driver is used for communications when the target operating system is in interrupt-driven mode. The functional difference is that the latter interrupt-driven mode is a driver that is typically used when not doing a remote debugging session, i.e., whatever device driver on an operating system functions when a computer system is typically being used. In an OpenVMS for AXP operating system, the boot driver is skeletal driver which generally functions only during booting of an AXP computer system. The interrupt-driven device driver may be characterized as a full-scale device driver that functions during normal operating system mode with a plurality of users. Due to the fact that each of these device drivers maintains a private copy of data which reflects the physical hardware state, it is necessary to insure that each of private copy of the data accurately reflects the current hardware state of the Ethernet card when the target operating system transitions between the two modes. One solution may use a global data area to communicate private data values when transitioning between modes. Another solution may initially set the hardware to a known physical state, and initialize private data values accordingly, each time a mode is transitioned to. The foregoing implementation issue and solutions may be relevant to a preferred implementation that uses the existing device drivers on an OpenVMS for AXP operating system to modify existing device driver routines.

When a target operating system is in polling mode, it may be in a "stopped" state, for example, repeatedly executing a code loop which polls for messages from the host computer system to the target system through boot drivers. Functionally, this stopped or polling mode freezes the operating system to enable execution of debug commands which may, for example, examine programming variables which represent the state of the operating system. The code loop may execute at the highest interrupt process level (IPL) such that all system interrupts are masked out, i.e., the execution of the code loop is not interrupted due to a system event. In a preferred implementation using an OpenVMS for AXP operating system, the code loop may execute at an IPL level of 31.

BOOTING A TARGET COMPUTER SYSTEM AND ENTERING POLLING MODE

The target computer system may be booted, as with a BOOT command flags on an OpenVMS for AXP system console, to indicate that the target computer system is to be left in the debug polling mode. During operating system booting, code may be conditionally executed which loads into memory debug machine executable code, and registers a special debug exception handler routine located in the debug machine executable code.

The debug exception handler may be registered by placing the address of the routine in a predefined location in system memory. The operating system dispatches execution control to the address specified in the predefined location in response to system exceptions. The debug machine executable code may be a portion of the target operating system code. Thus, when an operating system exception occurs, the operating system dispatches execution control to the debug exception handler routine and begins executing the routine's code to process the exception. The debug exception handler may comprise code which calls a looping routine to poll a network device, such as an Ethernet hardware device, for messages from the host computer system. An example of an OpenVMS for AXP operating system exception occurs when the CPU executes an Alpha AXP breakpoint (BPT) instruction.

Following registration of the debug exception handler, a breakpoint instruction may be purposefully executed during booting to cause the target computer system to transition into polling mode. At this point, the operating system transfers control and begins executing the debug exception handler which, in turn, masks out interrupts, i.e., sets the IPL level to 31, calls the appropriate device driver routine to set the network hardware, such as an Ethernet device, to its polling state, and then calls the looping routine. The operating system continues to execute this looping routine that polls the network hardware for messages from the host computer system.

If there is an existing network connection between the host and target computer systems, prior to invoking the looping routine, the target operating system may send an NDP report message to the host computer system indicating that the target operating system is in polling mode ready to process command messages from the host computer system. Note that there may be an existing network connection if the target computer system is rebooted causing repeated execution of the boot code.

The looping routine may implement the following pseudo-code or logical steps to poll for messages:

got_message=FALSE;
while (got_message is FALSE)
    call timer routine(got_message);
call get_message_from_ethernet();

dispatch to processing routine based on specific message;
The main loop routine may be part of the target operating system code 56 which calls a timer routine in the network communications library 58. The timer routine then calls the appropriate device driver routine that detects whether a message has been received on the network by the network hardware. The timer routine returns control to the looping routine with a result status indicating whether a message has been received or not. The timer routine may return this status in a return boolean parameter, such as got_message in the above example, in which FALSE indicates that no message has been received and TRUE indicates that a message has been received. The timer routine may also perform other functions such as calling the appropriate driver routines to reissue a message if, after a specified time period, an expected acknowledgement message was not received for a given message previously sent to the host computer system.

If the looping routine determines through examination of the timer return status that no message has been received, then the looping routine may again call the timer routine to poll the network hardware to determine if a message has been received. This looping process continues until the looping routine determines through examination of the timer routine return status that a message has been received. At this point, the looping routine may call additional routines in the network communications library 58 to retrieve the actual message received, unpackage the message, and return the data from the unpackaged message to the looping routine for processing. A message retrieval routine in the network communications library may retrieve the message received by calling the appropriate device driver routines. The message retrieval routine may also unpackage the message by, for example, removing a message header, and then placing return values in appropriate parameters which are returned to the looping routine to allow processing of the received message data.

In general, the looping routine may process received messages by examining the data returned by the timer routine to determine which NDP message has been received. The looping routine may then call another routine for processing of a specific NDP message type. Preferably, there may be one routine, comprising the operating system code 49, per message type in which each routine is called by the looping routine as needed for message processing.

Depending on the message type of the message to be processed, the target computer system may remain in polling mode or transition into interrupt-driven mode. Various message types will be described in text which follows.

After processing a received NDP message which requires the target computer system to transition to interrupt-driven mode, the looping routine returns control to the exception handler or interrupt handler which "cleans up", respectively, the exception or interrupt processing generally by restoring the target operating system to the previous state in which it was prior to the interrupt or exception and setting the network hardware device to its corresponding state. However, as will be discussed in following descriptions of user debug, such as a STEP user debug command, a handler may wish to resume to a different operating system state, i.e., begin execution at a new memory address, rather than restore a previous state.

For example, in an OpenVMS for AXP operating system, contents of system hardware registers are saved to a particular "save area" of system memory when an interrupt occurs but also prior to invoking the interrupt service routine to process the interrupt. The address of the save area is stored in the hardware SP register. Typically, when an interrupt handler is finished processing an interrupt, it executes a "return from interrupt" (REI) instruction causing the previously saved register values to be restored to the hardware registers. The CPU resumes executing the next instruction that would have been executed if the interrupt had not occurred. Note that the Alpha AXP REI instruction also restores an IPL from the save area. Thus, interrupts are masked and unmasked, as determined by the IPL change.

In a preferred implementation, as will be seen in detail in following descriptions, an exception handler may restore the target operating system to interrupt-driven mode by lowering the IPL level to enable interrupt processing mode, and by executing an REI instruction which causes the operating system to restore previously saved register contents, such as the address of the instruction that was being executed when the exception occurred, and resume executing instructions based on the restored information.

The state of a particular target computer system, i.e., hardware and software, may be described in a plurality of ways that vary with each implementation. Therefore, precise steps taken to change states may also vary with implementation. For example, the number and type of hardware registers used to reflect the state of the target computer system may vary and therefore, so will the information that is saved and restored upon a state change. Further, a particular architecture may include a machine instruction, such as the Alpha AXP REI instruction, which performs one or more of the precise steps, such as restore register and an IPL that effects system interrupts and system hardware operations.

In addition to registering a special debug exception handler during booting, other special handlers or special routines may be similarly registered to process other system events. The previously described "exception handler" may process system events classified as "exceptions", such as executing a BPT instruction. Similarly, an "interrupt handler" may be invoked to process system events classified as "input and output (I/O) interrupts", such as receiving a message from the network via the Ethernet hardware.

There are generally two classes of system events that may be reported to a CPU, such as an Alpha AXP processor that may comprise the host and target computer systems, and cause the CPU to change the instruction stream currently being executed to another instruction stream to handle the system event. These two classes of system events may be characterized as exceptions and interrupts. Generally, an exception may be a system event relevant to the currently executing process, such as an arithmetic exception, or the execution of a pre-determined special machine instruction, such as a breakpoint instruction. An interrupt may be a system event caused by a source external to the currently executing instruction stream, such as an I/O device, or a system clock. A programmer may specify an alternate instruction stream, such as an interrupt handler routine or exception handler routine, to be executed in response to a specific system event occurring.

When booting the target computer system using a BOOT command, the BOOT command flags may also indicate that the target computer system is to remain in the debug interrupt-driven mode as opposed to the previously described polling mode. Interrupt-driven mode may be characterized as a "normal" or non-debug mode in which the operating system may remain regardless of whether or not the operating system is enabled for remote debugging. At the end of operating system startup, interrupts are not masked out, i.e., the IPL level is not purposefully raised to 31 which would block all system events. Rather, the operating system is purposefully set to the "normal" IPL level and retains a "normal" start state, i.e., the IPL level and start state that the operating system retains if there is no remote debugging.

When a message is received by the target operating system which has been booted with the debug flags indicating the initial debug mode as interrupt-driven, as previously discussed, a device driver routine, or device interrupt handler, initially has execution control. The device driver routine may forward the message to the network communications library 58, either by a directly invoking a callback routine or by placing the message on a queue associated with a designated process or routine to be scheduled for execution by the operating system. The callback routine or designated process in the network communications library may call a routine in the target operating system code 49 passing message data as a parameter.

Once the target computer system 12 has been booted with the proper options leaving its operating system in a runtime mode ready to receive messages over a network 18 from a host computer system 10 for debugging, i.e., "polling mode" or "interrupt-driven mode", a remote debugger 46 may be started on the host computer system.

As previously described, the target operating system may initially enter polling mode, as caused by the execution of the breakpoint instruction while executing boot code, for example, of an OpenVMS for AXP operating system. Alternatively, for remote debugging, a target operating system may initially enter interrupt-driven mode and transition into polling mode, as by some other system event which raises an interrupt or exception on the target operating system. For example, the target operating system may be initially booted with boot flags that cause necessary debug machine executables to be loaded into memory, and leave the target operating system in interrupt-driven mode. No debug network connection is yet established. An NDP message received from the host computer system may cause a target operating system interrupt that results in the execution of a previously designated interrupt handler. The interrupt handler may then cause the target operating system to transition from the interrupt-driven mode to the polling mode and proceed as previously described.

DESCRIPTION OF A REMOTE DEBUGGING SESSION

In a preferred implementation, the target computer system is booted and remains in polling mode waiting for messages from the host computer system to establish a network connection. Using the previously described two process debugger model, the main debugger process on the host computer system may be placed into a runtime execution state by, for example, by logging onto the host computer system and establishing a user session, and entering a system RUN command from a keyboard and terminal connected to the user session. The RUN command may cause the main debugger process 50 and secondary debugger process 52 to be loaded into memory 28, and may cause the CPU 42 to begin executing instructions in the main debugger process.

The main debugger process may remain in a runtime state ready to accept debug commands entered from the keyboard or other input device. At this point, a user may enter a debug command with proper target computer system information, such as a CONNECT command with parameters specifying a target computer system node name, and a target computer system password, to enable the host computer system to initialize a network connection using the network 18 and communication lines 14 and 16. In this embodiment, the main debugger process may read an entered debug command, syntactically recognize the entered debug command and any parameters, as by searching a list of known debugger commands for the entered debug command, and semantically interpret the entered debug command and its parameters, as by using parsing methods and techniques, such as recursive descent parsing known to those skilled in the art. The main debugger process may translate the debug CONNECT command and its parameters into an NDP system initialization message (CMD_INIT).

The main debugger process may call a first routine in the secondary debugger process which, in turn, calls a second routine in the network communications library 48. The main debugger process may communicate data, which is needed for sending an NDP system initialization message, to the secondary debugger process by passing information as parameters when calling the first routine. In turn, the first routine in the secondary debugger process calls a second routine in the network communications library. The secondary debugger process may perform tasks such as arranging parameters in the proper order for the specific network communications library routine called. Additionally, the secondary debugger process may store information into memory on the host computer system for future use as dictated by the debug command and the details of a specific implementation.

The second routine in the network communications library on the host system may "package" the information in a predetermined message format by, for example, adding a message header before the actual message data, and a message trailer indicating, respectively, the start and end of the message, i.e. stream of bits. The message header may contain additional information that further describes the message itself. For example, the message header may include a byte count indicating the quantity of bytes contained in the actual message data.

The second routine may send the message on the network 18 by calling a device driver routine 44 to communicate with the Ethernet hardware and send the message to computer systems on the network. A system on the network, such as the target computer system 12, receives the message through a device driver routine 51. Execution control is passed from the device driver routine to a routine in the network communications library 50 which "unpackages" the message and passes it to the target operating system 49 which is in polling mode waiting for a message requesting a network connection.

ESTABLISHING A NETWORK CONNECTION

In establishing an initial network connection, the looping routine, previously described as being included in the target operating system code 49, may determine that the message received is an NDP initialization request message (CMD_INIT) and calls the appropriate processing routine. Functionally, the CMD_INIT routine initializes or re-initializes a remote debugging session between the host and target computer systems by causing the operating system code 49 to enter into the polling mode by, for example, calling the looping routine from the CMD_INIT routine. The CMD_INIT routine may also perform other tasks during initialization such as setting programming variables to indicate that the polling mode has been entered.

In response to receiving the CMD_INIT message, the target computer system unpackages the message, and may perform other tasks, such as account and password validation, to determine if appropriate security standards have been met to establish the network connection between the host and target computer systems over the network. Additionally, the target computer system may send an NDP response message RESP_INIT to the host computer system by, for example calling a RESP_INIT routine in the operating system code 49, to indicate if the network connection request was accepted.

Once an initial network connection between the host and target computer systems is established, a user on the host computer system may begin issuing user debug commands to test the target operating system code 49. At this point, the target operating system may be in polling mode. These user debug commands may be entered on the host computer system from using the terminal, keyboard and mouse, for example, associated with the previous session on the host computer system. As previously discussed, the user debug commands are processed by the main debugger process 46 and translated into a series of NDP messages by the secondary debugger process 47. In turn, the NDP messages are sent to the target computer system using the network communications library 48 and device driver routines 44 and network 18.

A plurality of user debug commands may be included in an implementation in accordance with the invention. The set of user debug commands may vary with implementation of the remote debugger and may also depend on the needs of a particular computer system configuration embodying the invention. For example, a target computer system may have its console located in an inconvenient physical location that is not in close proximity to a host computer system. While remotely debugging untested target operating system code, the target computer system may require rebooting from its system console which is not in close physical proximity to a remote debugger session controlling the debugging. Therefore, it is desirable to have the capability to reboot the target computer system from a remote debugger session on the host computer system. A REBOOT user debug command may provide this capability.

Figure 4A:
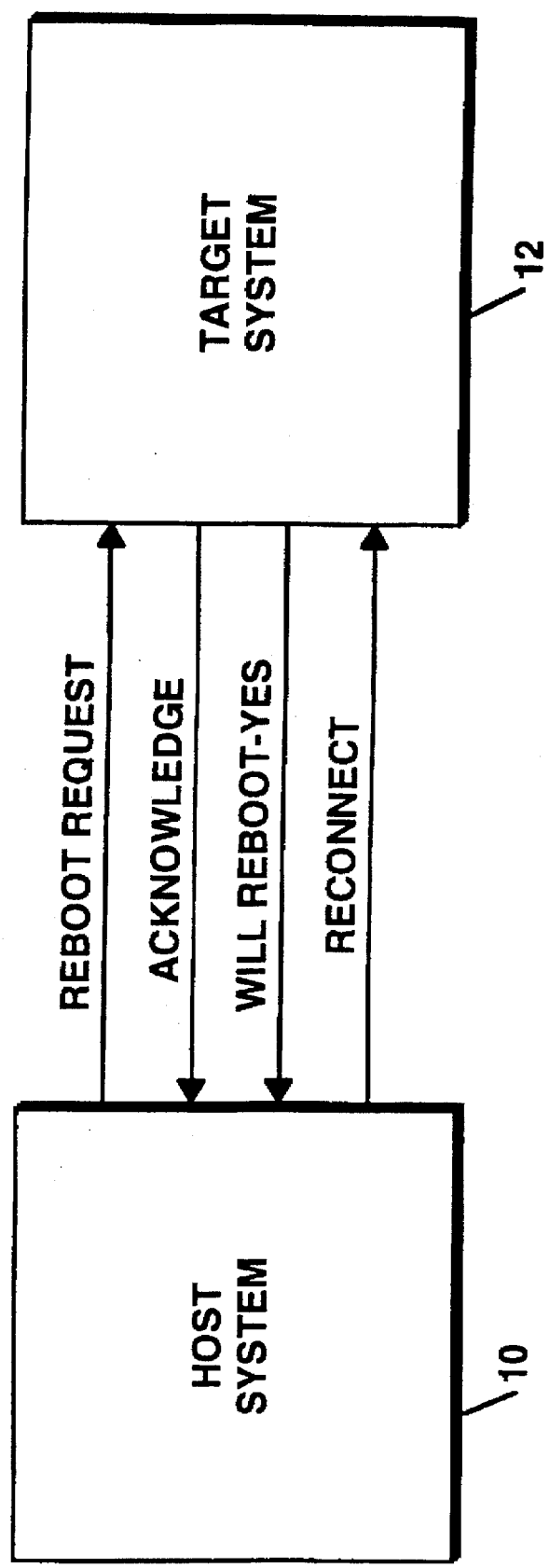
FIG. 4A illustrates the messages exchanged in accordance with the invention between host and target computer systems when the target system will boot.
Figure 4B:
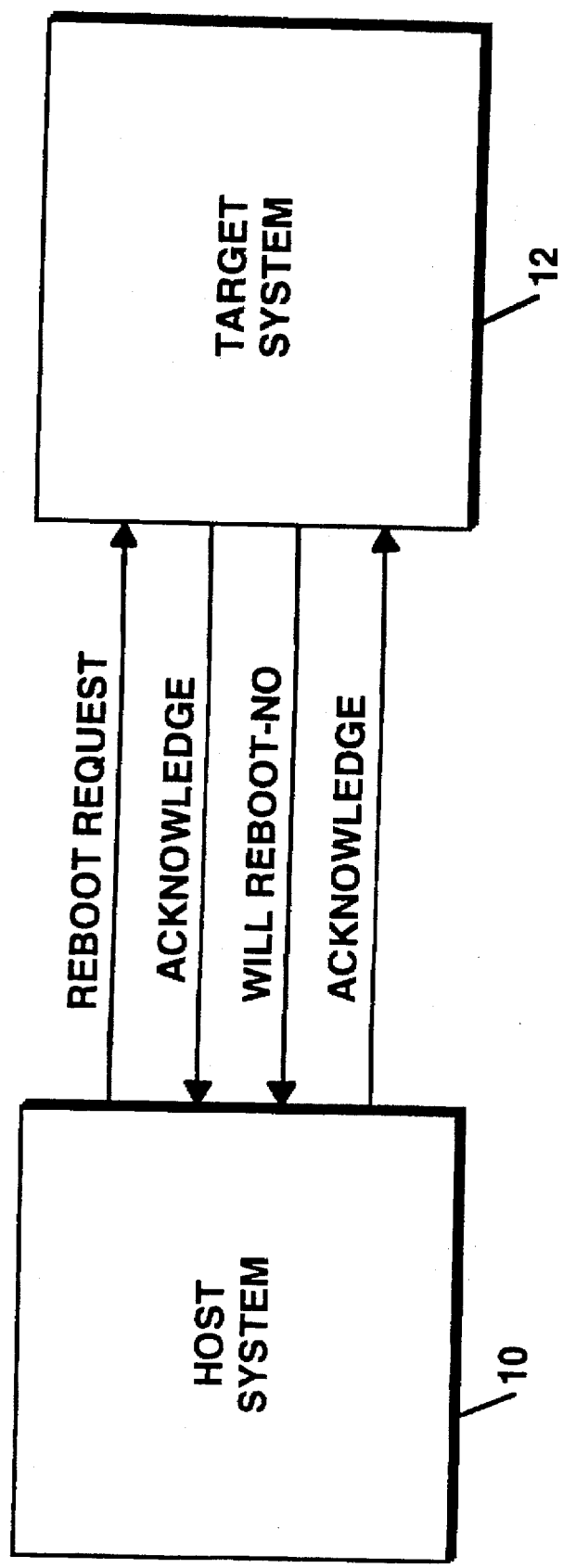
FIG. 4B depicts the messages exchanged, in accordance with the invention, between host and target computer systems when the target system will not boot.
Figure 5:
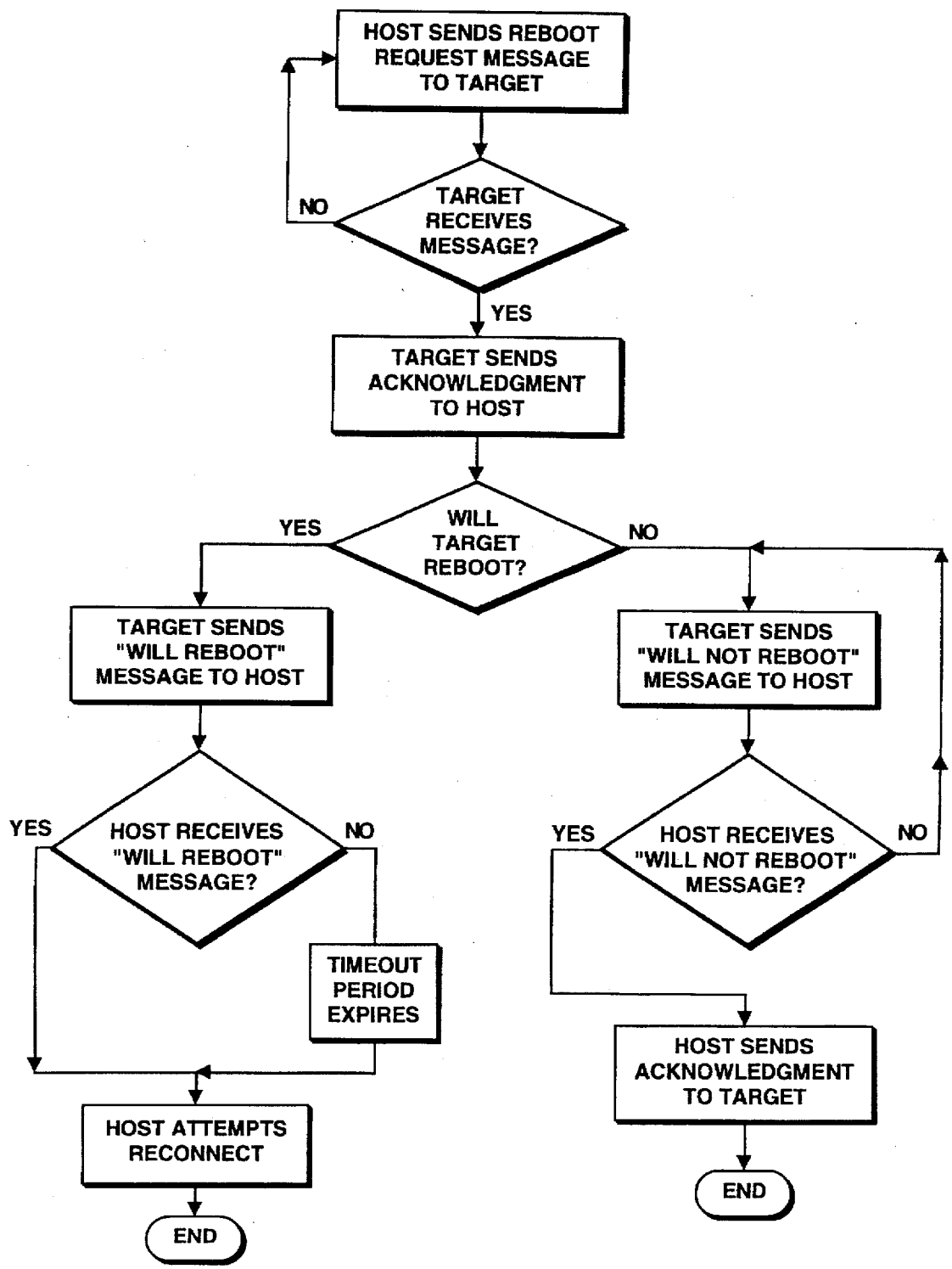
FIG. 5 is a flowchart outlining a method of the invention which includes the messages exchanged when booting a target computer system from a host computer system.

A common-knowledge or message synchronization problem, called the reboot commit problem, exists when implementing the REBOOT command between a host and a target computer system. For example, the host computer system send a reboot request message to the target computer system. The host computer system does not know if this reboot request has been received. Even if the target computer system receives the reboot request, sends an acknowledgement message to the host computer system, and begins rebooting, the host computer system may attempt to reconnect to the target computer system and fail because the target computer system is not done rebooting. In response to sending the reboot request, the host computer system may not receive an acknowledgement message and continue to wait for one. The invention provides a solution, which will now be described, for implementing the REBOOT command through communicating a plurality of NDP messages between the host and target computer systems. A solution to the REBOOT commit problem is illustrated in FIGS. 4A, 4B and 5. A user may enter the REBOOT command in a remote debugging session to request a reboot of the target operating system. As previously described, the remote debugger translates the user debug REBOOT command into one or more NDP messages to be sent to the target computer system. The host computer system sends an NDP REBOOT request message to the target computer system. At the beginning of the messages exchanged to implement the REBOOT debug command, the target computer system is in polling mode. To acknowledge receipt of the REBOOT request message, the target computer system sends a first NDP REBOOT response (REBOOT_RESP) message to the host computer system. The host computer system repeatedly sends the REBOOT request message until it receives the first REBOOT_RESP message from the target computer system. The target computer system then sends a second REBOOT_RESP message indicating that it "will reboot" or "will not reboot".

In the former case, i.e., the target system will reboot, the host computer system sends a CONNECT request message to the target computer system regardless of whether or not it receives the second REBOOT_RESP message. Rather, the host computer system will attempt to connect to the rebooted target computer system either when it receives the second REBOOT_RESP message, or after a predetermined timeout period expires. After sending the second REBOOT_RESP message, the target computer system transitions to interrupt-driven mode and begins executing boot code. The target computer system may transition into polling mode if a breakpoint instruction is purposely executed in the boot code, as previously described.

If the target system will not reboot, the target computer system repeatedly send the second REBOOT_RESP message until it receives a message from the host computer system acknowledging receipt of the second REBOOT_RESP message.

Although the foregoing solution for remotely booting a computer system has been presented in the context of rebooting a target computer system in a remote debugging context, the solution may be generally applied to remotely booting a first computer system from a second computer system in a distributed computer system environment.

Other factors may be considered when implementing the general solution in accordance with the invention in other contexts. For example, applying the general solution afforded by the invention to initially booting, rather than rebooting, a target computer system, there may not be an existing network connection and security issues, such as an account and password validation, may need to be resolved prior to commencing the remote booting.

The invention affords an efficient and flexible way of remotely booting a target computer system from a host computer system. The two computer systems may communicate efficiently using a high communications bandwidth, such as using an Ethernet network connection. Further, the invention affords a flexible solution that may be implemented using an existing communication medium, such as an existing departmental network, without requiring a special system configuration, a dedicated connection between the host and target computer systems, or close physical proximity of the two computer systems.

While a particular embodiment of the invention has been disclosed, it will be appreciated by those skilled in the art that different modifications are possible and are within the true scope and spirit of the invention as defined in the claims set forth below.

What is claimed is:

1. A method of remotely booting a first computer system from a second computer system, said first and second computer systems communicating messages over a communication medium, said first computer system comprising a first operating system, the method comprising:

sending a boot request message from said second computer system to said first computer system, said boot request message requesting booting of said first computer system wherein said booting comprises said first computer system executing boot code that is included in said first operating system;

acknowledging receipt of said boot request message by said first computer system by communicating a first acknowledgement message to said second computer system;

sending a response message from said first computer system to said second computer system in response to said first computer system receiving said boot request message, said response message indicating whether said first computer system will boot;

sending a second acknowledgement message from said second computer system to said first computer system upon receiving said response message, said second acknowledgement message indicating receipt of said response message if said response message indicates that said first computer system will not boot, and said second acknowledgement message being a reconnect request message if said response message indicates that said first computer system will boot;

repeatedly sending said response message until said second acknowledgement message is received when said response message indicates that said first computer system will not boot; and booting said first computer system if said response message indicates that said first computer system will boot.

2. The method of claim 1 further comprising sending a third acknowledgement message from said second computer system to said first computer system if said response message is not received by said second computer system after a specified timeout period has elapsed, said third acknowledgement message being a connect request message requesting that a communication connection be established between said first and second computer systems.

3. The method of claim 1 wherein said first computer system comprises software being tested, said second computer system comprises a second operating system, a software debugger in said second computer system controls a remote debugging session to test said software, said method for booting of claim 1 being performed by issuing a user debug command to said software debugger.

4. The method of claim 1, wherein said communication medium is a network.

5. The method of claim 1, wherein said communication medium is point-to-point connection between said first and said second computer systems.

6. A method of remotely booting a target computer system from a host computer system, said host computer system comprising a software debugger, said target computer system comprising a portion of machine executable code being tested and a first operating system, said host computer system and said target computer system communicating over a communication medium, the method comprising:

translating, using said software debugger, a user debug command into a boot request message;

communicating said boot request message from said host computer system to said target computer system, said boot request message requesting booting of said target computer system wherein said booting comprises said target computer system executing boot code that is included in said first operating system, said target computer system being in a stopped state in which system interrupts are disabled;

acknowledging receipt of said boot request message by said target computer system by communicating a first acknowledgement message to said host computer system;

sending a response message from said target computer system to said host computer system in response to said target computer system receiving said boot request message, said response message indicating whether said target computer system will boot;

sending a second acknowledgement message from said host computer system to said target computer system, said second acknowledgement message indicating receipt of said response message if said response message indicates that said target computer system will not boot, and said second acknowledgement message being a connect request message if said response message indicates that said target computer system will boot;

repeatedly sending said response message until said second acknowledgement message is received when said response message indicates that said target computer system will not boot; and transitioning said target computer system to an interrupt-driven state and then executing said boot code when said response message indicates that said target computer system will boot, said interrupt-driven state being a state in which said target computer system is in a normal system processing and execution state permitting a device that receives messages to be interrupt-driven.

7. The method of claim 6, wherein said communication medium is a network, said stopped state of said target computer system comprises a first target operating system state and a corresponding first network hardware state of said network hardware in said target computer system, said target computer system communicates to said host computer system using said network hardware, said first target operating system state being a state that masks out system interrupts and freezes said target operating system, said corresponding first network hardware state being a state in which said target computer system polls said network hardware to retrieve a message received by said target computer system.

8. The method of claim 7, wherein said interrupt-driven state of said target computer system comprises a second target operating system state and a corresponding second network hardware state of said network hardware, said second target operating system state being a state that does not mask out system interrupts and represents a normal operating system processing and execution mode, said corresponding second network hardware state being a state in which said network hardware functions as an interrupt-driven device when a message is received by said target computer system.

9. The method of claim 6, wherein said first contents indicating whether said target computer system will or will not boot is communicated to said software debugger.

10. The method of claim 6, wherein said boot request message requests a reboot of said target computer system.

11. The method of claim 6, wherein said boot request message requests an initial boot of said target computer system.

12. An apparatus for remotely booting a first computer system from a second computer system, said first and second computer systems communicating messages over a communication medium, said first computer system comprising a first operating system, the apparatus comprising:

first communication means for sending a boot request message from said second computer system to said first computer system, said boot request message requesting that said first computer system execute boot code that is included in said first operating system;

first acknowledging means for acknowledging receipt of said boot request message by said first computer system by communicating a first acknowledgement message to said second computer system;

second communicating means for sending a response message from said first computer system to said second computer system in response to said first computer system receiving said boot request message, said response message indicating whether said first computer system will boot;

third communicating means for sending a second acknowledgement message from said second computer system to said first computer system upon receiving said response message, said second acknowledgement message indicating receipt of said response message if said response message indicates that said first computer system will not boot, and said second acknowledgement message being a reconnect request message if said response message indicates that said first computer system will boot;

said third communicating means includes means for repeatedly sending said response message until said second acknowledgement message is received when said response message indicates that said first computer system will not boot; and first computer system boot means for booting said first computer system if said response message indicates that said first computer system will boot.

* * * * *